Aug. 13, 1963

L. A. ERICKSON 3,100,583

LID-DISPENSER

Filed Aug. 2, 1962

INVENTOR.
LEONARD A. ERICKSON

BY MAHONEY, MILLER & RAMBO
BY *Wm. V. Miller*
ATTORNEYS

INVENTOR.
LEONARD A. ERICKSON
BY MAHONEY, MILLER & RAMBO
ATTORNEYS

Aug. 13, 1963

L. A. ERICKSON 3,100,583

LID-DISPENSER

Filed Aug. 2, 1962

INVENTOR.
LEONARD A. ERICKSON

BY
MAHONEY, MILLER & RAMBO
BY
ATTORNEYS

Aug. 13, 1963   L. A. ERICKSON   3,100,583
LID-DISPENSER
Filed Aug. 2, 1962   7 Sheets-Sheet 5

INVENTOR.
LEONARD A. ERICKSON
BY MAHONEY, MILLER & RAMBO
BY
ATTORNEYS

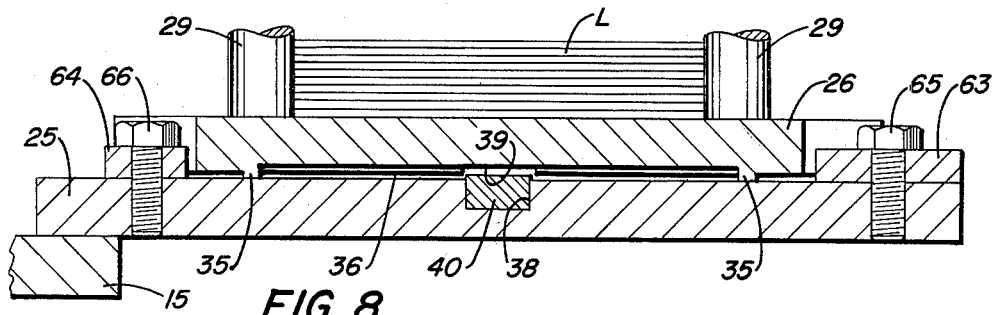
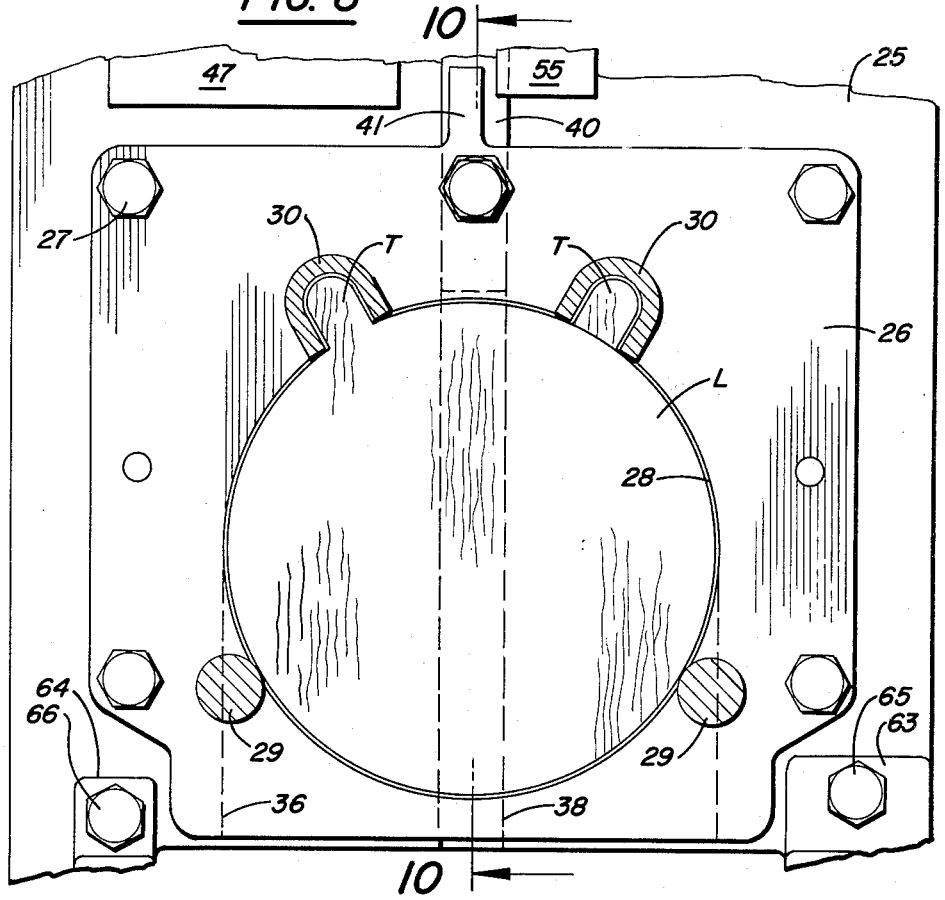

Aug. 13, 1963 L. A. ERICKSON 3,100,583
LID-DISPENSER
Filed Aug. 2, 1962 7 Sheets-Sheet 7
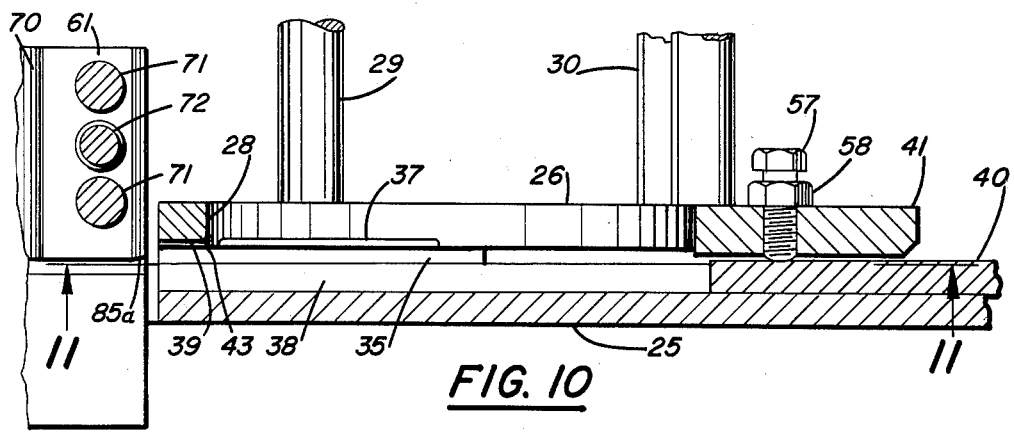
FIG. 10
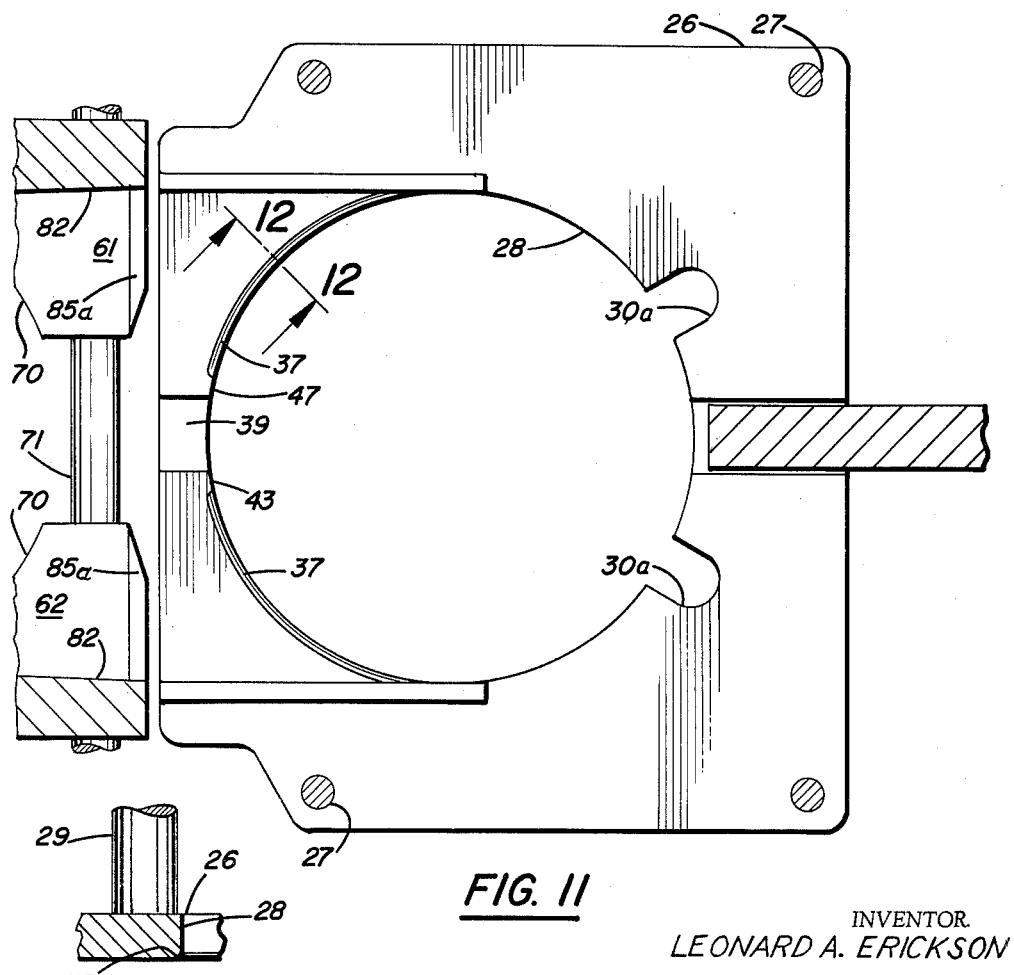
FIG. 11
FIG. 12
INVENTOR.
LEONARD A. ERICKSON
BY MAHONEY, MILLER & RAMBO
BY Wm. V. Miller
ATTORNEYS

3,100,583
LID-DISPENSER
Leonard A. Erickson, Columbus, Ohio, assignor to Big Drum, Inc., Columbus, Ohio, a corporation of Ohio
Filed Aug. 2, 1962, Ser. No. 214,365
10 Claims. (Cl. 221—36)

This invention relates to a lid-dispenser. It has to do, more particularly, with a unit for dispensing or feeding lids successively from the bottom of a stack positioned in a magazine and for moving each lid to a position where it is to be engaged by a plunger which will force it into the mouth of a container. The unit is especially designed for handling that type of flexible lid, usually formed of paper, cardboard or plastic, which is of disc-like form and which has a radially projecting tab. This type of tab lid is forced into the upper end or mouth of a paper or plastic container and flexes and snaps beneath a retaining shoulder therein, with the tab extending axially outwardly or radially inwardly to facilitate pulling of the lid from the container.

According to this invention, the lids are fed successively into association with a novel arrangement of lid-engaging jaws which hold each successive lid in position to be engaged by the plunger to force it into the aligned container. These jaws are so designed that each lid is gradually gripped and is bowed slightly as it is moved into association therewith. The bowing insures proper gripping of the lid and holding of it in proper position for engagement of the plunger without danger of the lid prematurely snapping out of position. Bowing of the lid also insures continuous engagement with the edge of the lid by the leading edge of the stripper slide as it moves the lowermost lid of the stack into position for insertion into the container. In addition to the proper gripping of the lid, the jaws are movable together to center them relative to the stripper and the container which is to receive the lid. Also, the jaws are infinitely adjustable relatively to receive lids of a wide variation in diameter. The magazine is designed relative to the jaws to position the lids angularly, for example, according to the grain of the paper, to obtain the best flexing action when gripped by the jaws. In the manufacture of lids which have an outwardly projecting "removal" tab, it is customary that the tab be oriented at 30° from the direction of the grain in the material. The handling of lids in this type of device can be best done by keeping the grain of the material in a direction roughly parallel to the path of the lid as it is moved from the stack to the adjustable jaws.

The preferred embodiment of this invention is illustrated in the accompanying drawings in which:

FIGURE 7a is an enlarged vertical sectional detail taken along line 7a—7a of FIGURE 7 of the edge-engaging surface of one of the jaws.

FIGURE 8 is an enlarged transverse vertical sectional view taken along line 8—8 of FIGURE 4.

FIGURE 9 is an enlarged horizontal sectional view taken along line 9—9 of FIGURE 3.

FIGURE 10 is a vertical sectional view taken substantially along line 10—10 of FIGURE 9.

FIGURE 11 is a horizontal sectional view taken along line 11—11 of FIGURE 10.

FIGURE 12 is an enlarged detail in section taken along line 12—12 of FIGURE 11.

Figure 1:
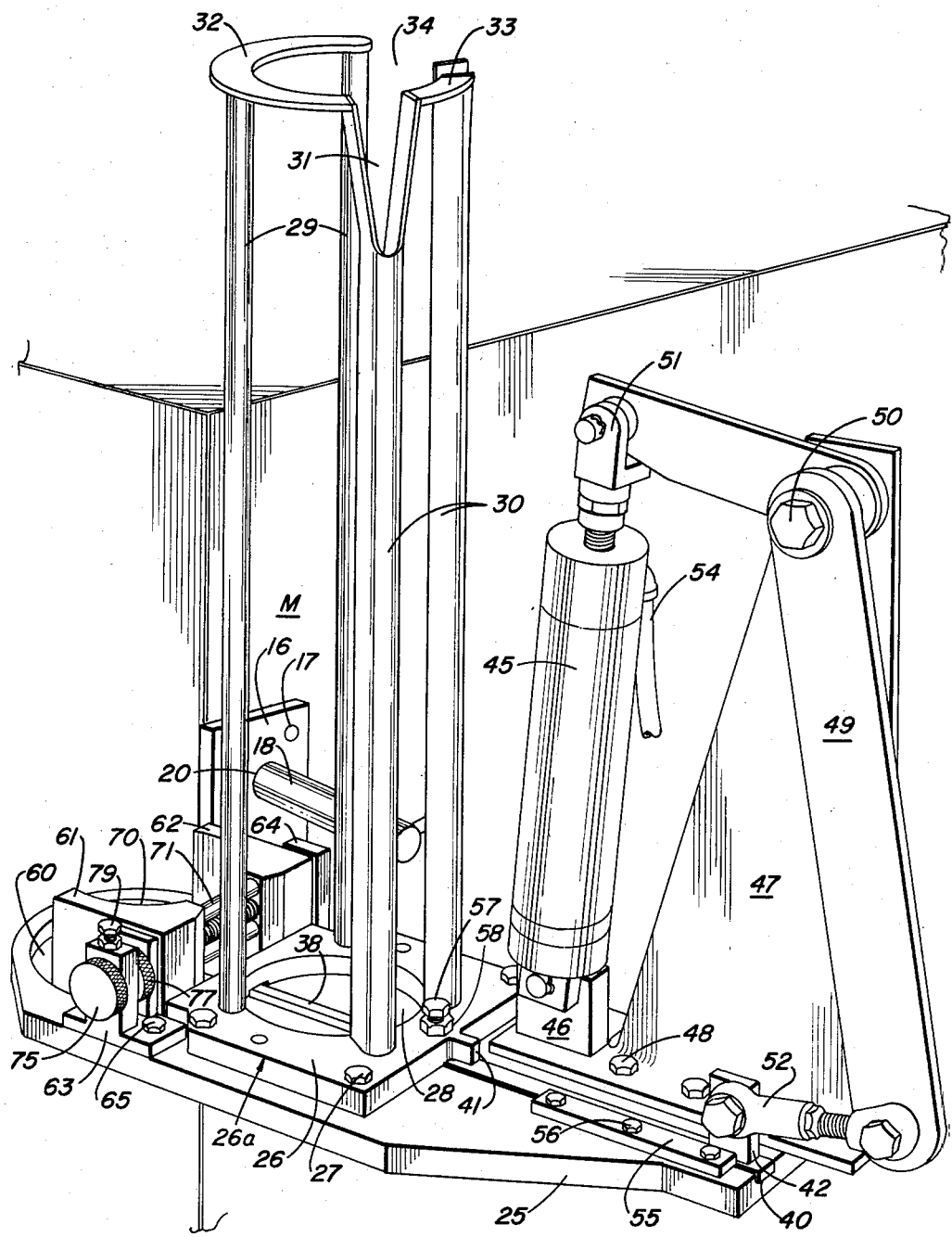
FIGURE 1 is a perspective view of a lid-dispensing or feeding unit embodying this invention.

With reference to the drawings, the present invention is shown as embodied in a dispenser for dispensing tab lids successively from the lower end of a stack in a magazine. The lids are indicated by the reference character L (FIGURES 8 and 9) and are of disc-like form having a tab T extending radially therefrom. These lids or caps, as previously indicated, are usually made of paper or plastic or other suitable material and are relatively flexible.

Figure 2:
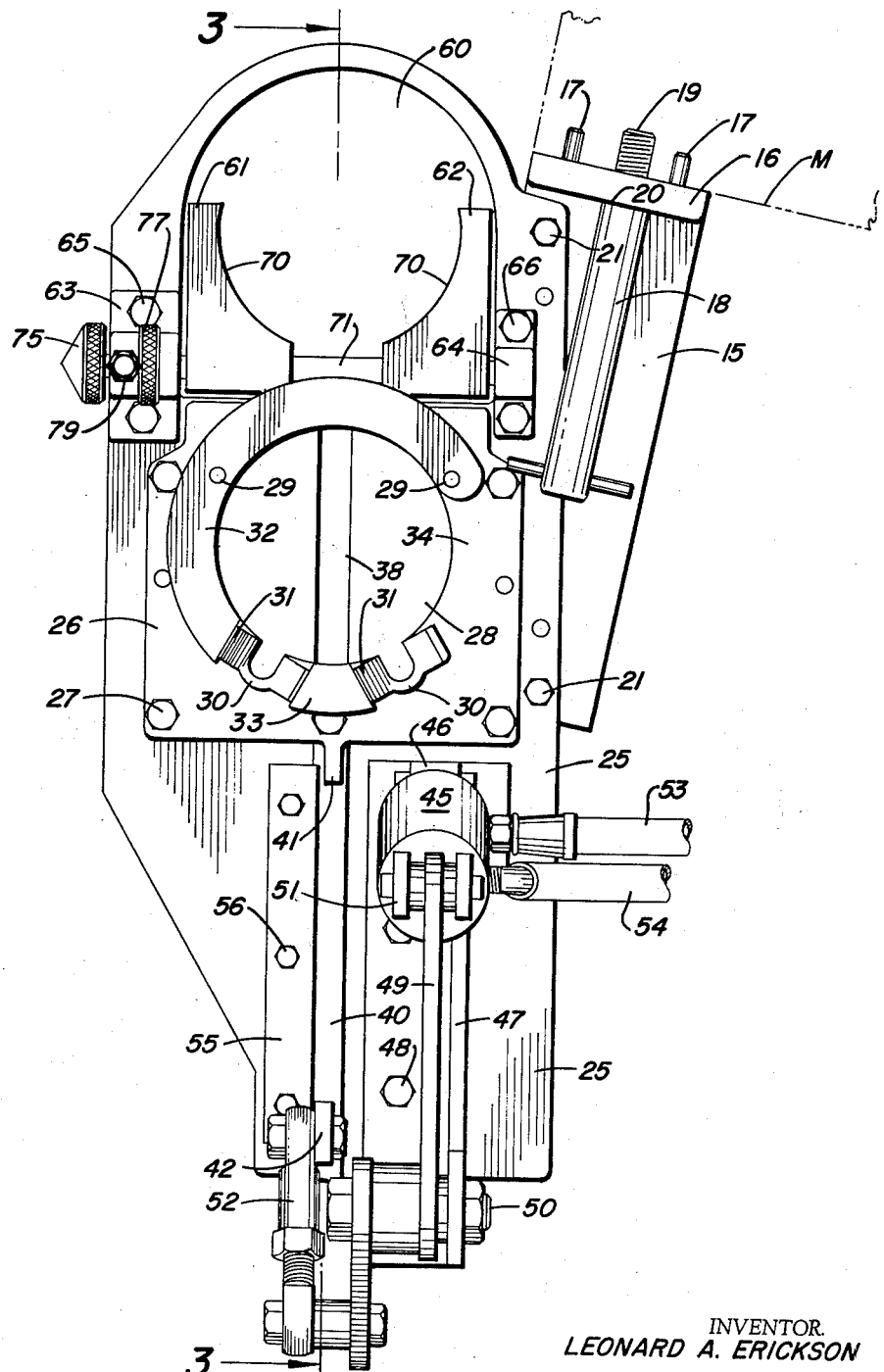
FIGURE 2 is a plan view of the unit.

The entire unit may be suitably supported, for example, on a machine indicated at M (FIGURE 2) which may be a container filling machine. For this purpose, a support bracket or arm 15 may be provided which is horizontally disposed and has an upturned inner end 16 which has a flat inner surface that abuts a flat surface of the machine M. Dowels 17 are provided on the bracket 16 which fit into locating openings in the machine surface. For clamping the bracket end 16 to the machine surface, a clamping screw 18 is provided, this screw having a threaded inner end 19 which is positioned in a threaded socket in the machine surface and a shoulder 20 for engaging the outer surface of the bracket end 16. The horizontal part of the bracket 15 may be removably attached by bolts 21 to a side edge of the base plate or supporting shelf 25 of the lid-dispenser unit.

The base plate 25 is of elongated form and intermediate its ends it supports the magazine 26a for the stack of lids L. This magazine includes a support and guide plate 26 (FIGURE 1) of flat form and substantially square outline which rests on the upper surface of the base plate 25 and is removably bolted thereto by the bolts 27. This plate has a central opening 28 just slightly larger in diameter than the lids L which are to drop therethrough. The plate 26 supports a pair of upstanding guide rods 29 and a pair of upstanding guide tubes 30 which are spaced equally angularly around the guide opening 28. The lower ends of the tubes 30 register with notches 30a in the plate 26 which are at the edge of the opening 28. For dispensing stacks of different size lids, various magazines may be substituted, it being simple to remove and replace the plate 26 and the magazine parts which it carries, it being understood that the plates 26 will have various size openings 28.

Each tube 30 is designed to selectively receive the tabs T of a stack of the lids L (FIGURE 9) and is of hollow U-shape cross section opening radially inwardly. Each tube 30 at its upper end is split or bifurcated (FIGURE 1) to provide a converging V-shape guide throat 31 to direct the tabs T into the upper end of one of the tubes. Thus, loading of the stack of tabs into the magazine provided by the guide rods 29 and guide tubes 30 is greatly facilitated. The two rods 29 and an adjacent tube 30 are connected together at their upper ends by means of a semi-circular brace 32 and similarly the upper bifurcated ends of the tubes 30 are connected together by a bracing leg 33. However, a space 34 is provided between the upper end of one of the rods 29 and an adjacent tube 30 to further facilitate insertion of the stack into the magazine. In FIGURE 9, one of the lids L is shown with its tab T in one of the tubes 30 and another is shown with its tab in the other tube 30 but it will be understood that usually the entire stack will be oriented in one direction.

A cylindrical weight W may be positioned on the uppermost of the lids of the stack between the upright guides 29 and 30 to press the lids downwardly.

The plate 26 is provided with depending lugs 35 on its lower surface which will space such lower surface precisely from the upper surface of the plate 25 as shown in FIGURE 8. At this surface, a lid guide channel 36 of proper depth is provided between the two plates for permitting the lowermost lid to be stripped from the stack and to be guided through the channel to be engaged by the lip gripping jaws. This channel is directed outwardly or forwardly from the opening 28 as shown best in FIGURE 8. It will be noted in FIGURES 10, 11 and 12 that the lower surface of the plate 26 is recessed to provide the channel and at opposite sides of the channel along the arcuate entrance to the channel, the edge of the recessed surface is rounded as indicated at 37 to facilitate entrance of a lid into the channel. The base plate 25 is provided in its upper surface with a centrally located guide channel 38 which receives the stripper slide 40 in the form of a bar of rectangular cross section. This bar, as noted in FIGURE 8, will project above the surface of the plate 25 to substantially the same extent as the projection of the lugs 35 below the lower surface of the plate 26. The lower surface of the plate 26 is recessed slightly at 39 to receive the bar 40. The rear edge of the plate 26 is provided with a rearwardly extending stop lug 41 which will limit the forward or outward movement of the stripper 40 by engagement with an upstanding lug 42 at the inner or rear end of the stripper bar 40 to prevent the leading end thereof from projecting into the opening 28 to avoid interference with the lid-inserting plunger. It will be noted in FIGURES 10 and 11 that the rounded corners 37 do not extend to the stripper-receiving recess 39 so that at each side of this recess there are sharp edges or corners 43 which prevent two lids from starting through the channel 36 and jamming between the radii 37 and the top surface of the base plate 25.

Figure 3:
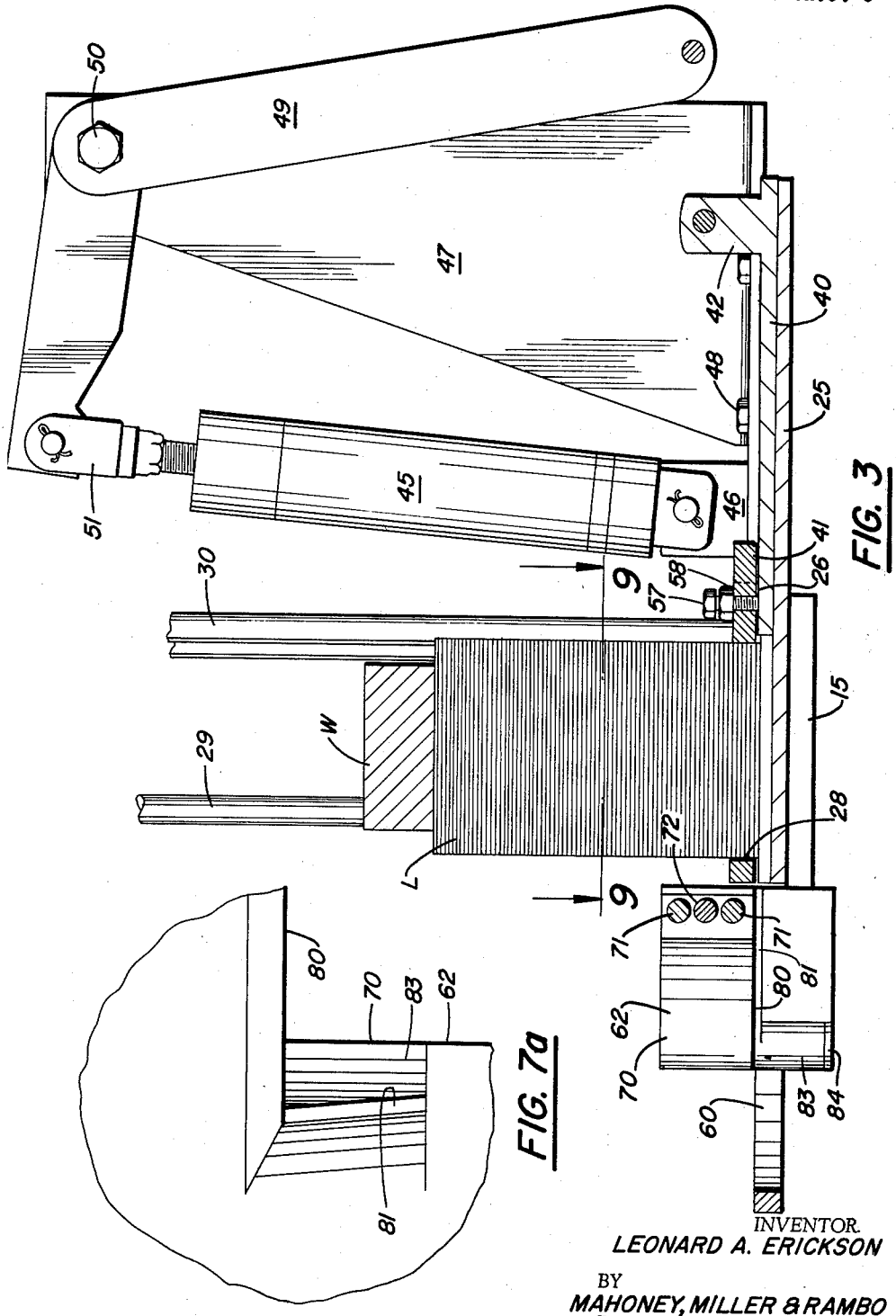
FIGURE 3 is a fragmentary longitudinal vertical sectional view of the unit taken along line 3—3 of FIGURE 2.
Figure 4:
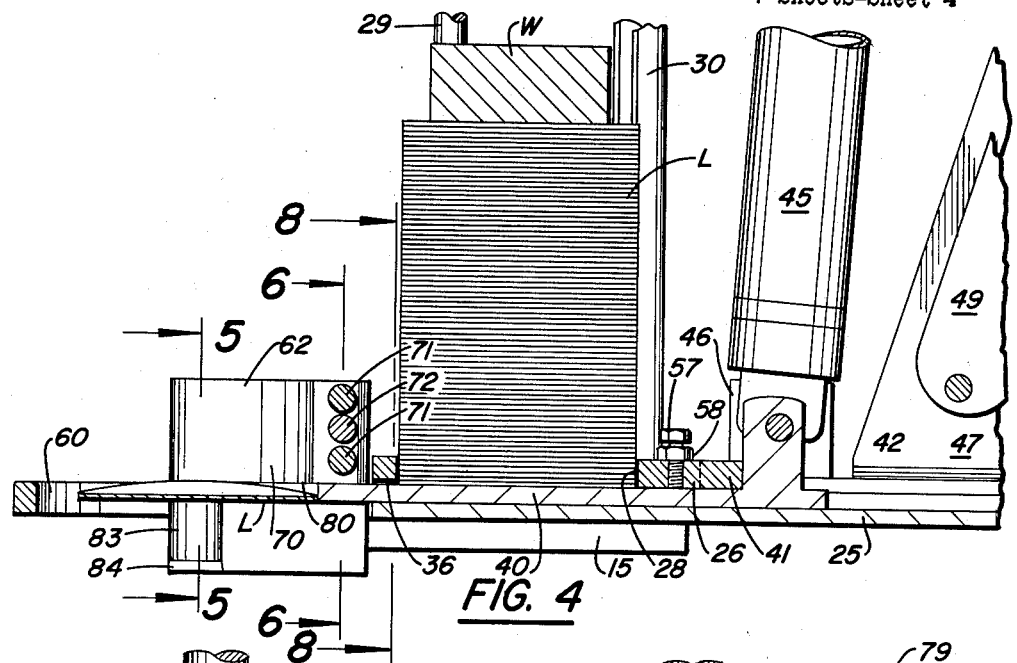
FIGURE 4 is a fragmentary vertical sectional view similar to FIGURE 3 but showing the stripper slide in a different position.
Figure 5:
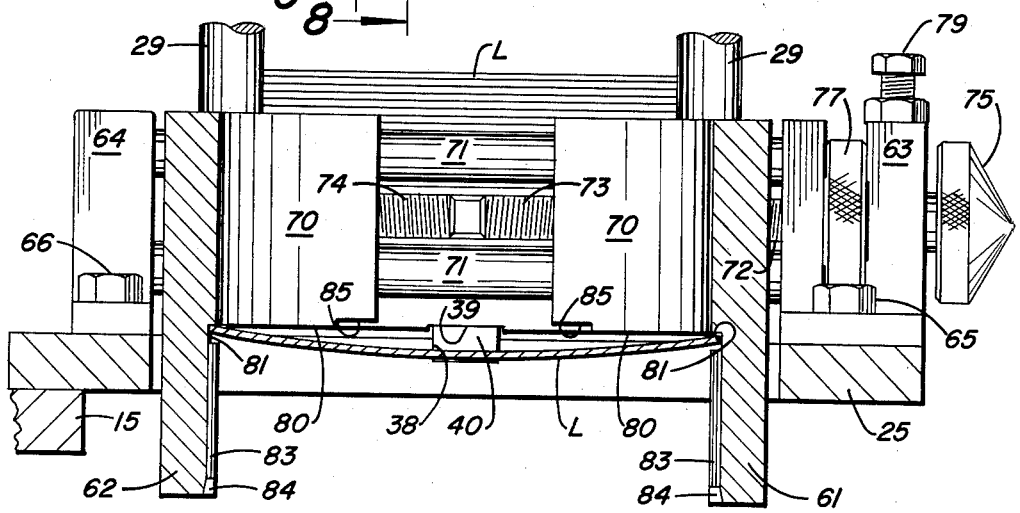
FIGURE 5 is an enlarged transverse vertical sectional view taken along line 5—5 of FIGURE 4.

For moving the stripper bar 40, as shown best in FIGURE 1, a fluid-actuated unit, for example, an air-cylinder and piston unit 45, is pivoted at its lower end to an upstanding lug 46 which is on a horizontal flange of an upstanding bracket 47, the flange resting on and being bolted by bolts 48 to the upper surface of the base plate 25 behind the plate 26 and adjacent the stripper guide channel 38. The upstanding bracket 47 supports a bell crank lever 49 fulcrumed thereto at 50. The upper end of this lever is connected to the upper end of the piston rod of the unit 45 by a clevis connection 51 and its lower end is connected by a pivoted axially extensible link 52 to the lug 42 on the stripper 40. Suitable valve mechanism associated with the conduits 53 and 54 (FIGURE 2) will control the operation of the cylinder and piston unit 45 to reciprocate the stripper and these conduits may be flexible or include flexible sections to permit swinging of the unit 45 in a vertical plane. A retaining strip 55 may be positioned over the stripper bar 40 at one of its edges (FIGURE 2) to keep it in the channel 38 and this strip may be clamped to the upper surface of the base plate 25 by the bolts 56. A bolt 57 (FIGURES 1 and 3) is threaded down through the plate 26 so that its lower end will be positioned almost in contact with the upper surface of the stripper 40 to prevent rising thereof. A lock nut 58 will hold this bolt in precisely adjusted position.

As shown in FIGURES 1 to 7, outwardly beyond the plate 26 at the forward or outer end of the plate 25 is an opening 60 through which the lid-inserting plunger (not shown) of the machine M is adapted to pass downwardly. As previously indicated, it is desirable to hold each successive lid L, moved outwardly by the stripper 40, in a centered position relative to this opening so that the plunger will engage it on its downward movement through the opening to insert it into the mouth of the container. For this purpose a pair of lid-gripping jaws consisting of the jaws 61 and 62 are provided. These jaws are substantially allochiral with respect to each other and a detailed description of one will suffice for both. The jaws 61 and 62 are associated with the opening 60 and are adjustable laterally relative thereto as a unit or relative to each other. The jaws are carried by the upstanding bearing lugs 63 and 64 which are clamped by clamping bolts 65 and 66, respectively, to the upper surface of the base plate 25 on opposite sides of the opening 60. It will be noted from FIGURE 1 that the forward corners of the plate 26 are removed to prevent interference with these lugs.

The jaws 61 and 62 are substantially of block form but each has a substantially vertical surface 70 which is curved laterally. The jaws 61 and 62 are mounted for transverse sliding movement on a pair of vertically spaced guide rods 71 which have their opposite ends fixed in the respective upstanding lugs 63 and 64, as shown best in FIGURES 1 and 6. Passing transversely through the jaws 61 and 62 is an adjusting shaft 72 which has right and left hand screw sections 73 and 74 threaded into the respective jaws 61 and 62 and which is rotatably disposed in the lugs 63 and 64. The shaft 72 is rotated by means of a knob 75 on its one end which projects outwardly through the lug 63 and which is set thereon by a setscrew 76. Axial movement of the shaft 72 is prevented normally by a disc or nut 77 threaded on the threaded outer portion of the shaft and set by a setscrew 78, the nut being disposed between the bifurcations on the lug 63. Thus, when the knob 75 is rotated, the shaft 72 is rotated, but does not move axially, so that the jaws 61 and 62 will feed toward or away from each other depending upon the direction of rotation of the shaft. To lock the shaft against rotation, a locking bolt 79 is provided in the lug 63 for engaging the hub of the knob 75. To shift the shaft 72 axially to adjust the jaws 61 and 62 laterally as a unit, the setscrew 78 will be released to permit axial movement of the shaft 72 through the nut 77 and with the screw 78 released, the shaft 72 may be adjusted axially relative to the lugs 63 and 64 by turning the knob 75 relative to the nut 77. Then the setscrew 78 will be tightened to hold the shaft in its adjusted axial position. Thus, the jaws 61 and 62 may be adjusted toward or from each other or may be adjusted bodily as a pair to center them relative to the opening 60.

Figure 6:
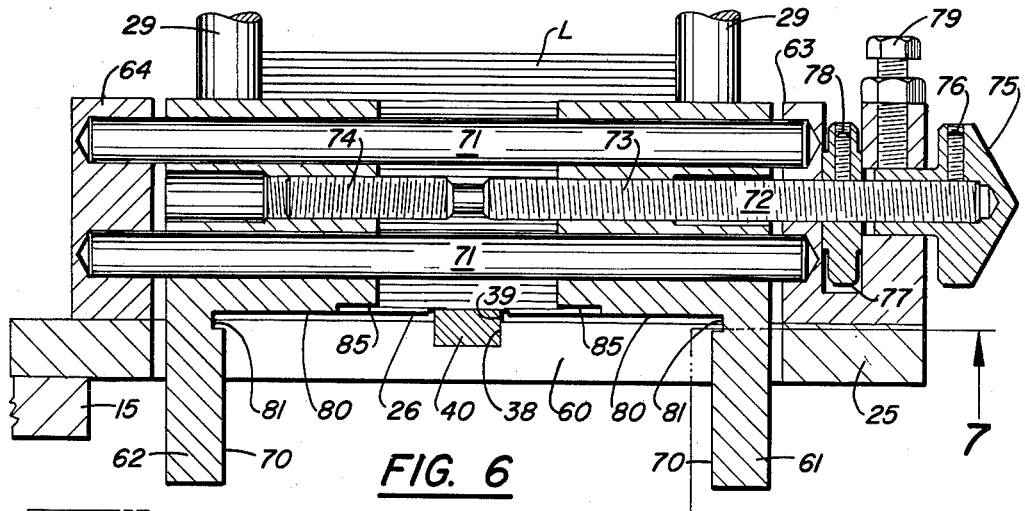
FIGURE 6 is an enlarged transverse vertical sectional view taken along line 6—6 of FIGURE 4 showing the lid-engaging jaws.
Figure 7:
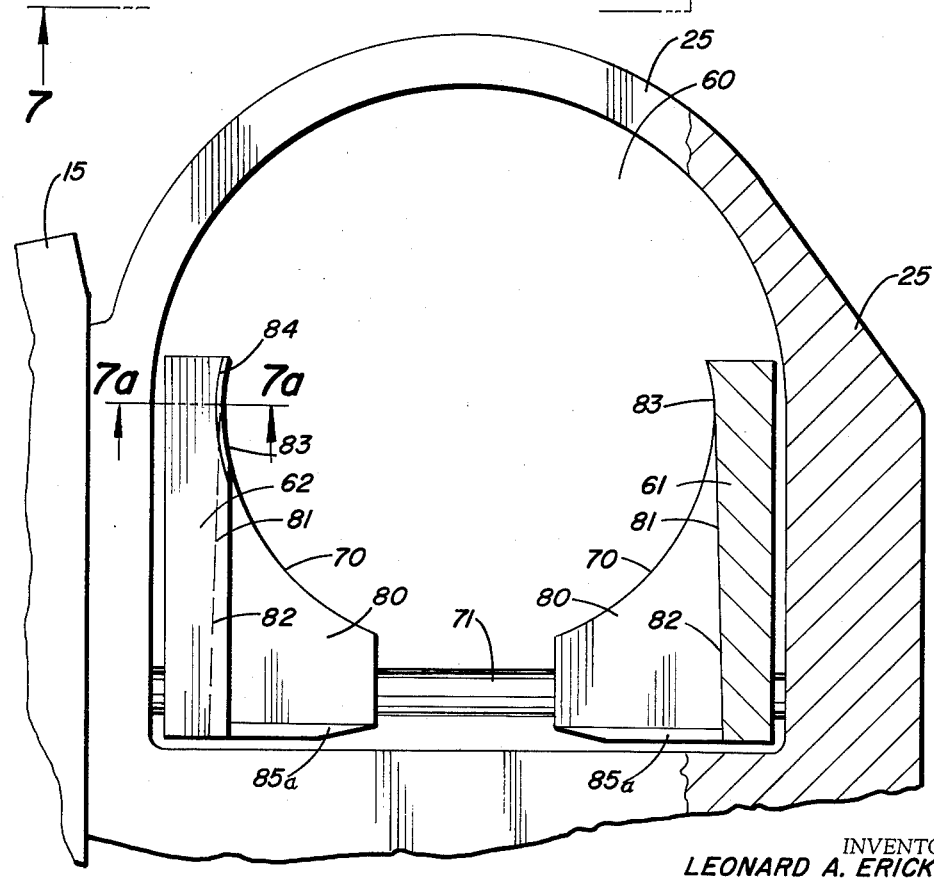
FIGURE 7 is a horizontal sectional view through the jaws shown in FIGURE 6 and taken along line 7—7 of that figure.

It will be noted from FIGURE 6 that each of the jaws is provided with a horizontal lower flat surface 80 that is at right angles to the vertical curved surface 70. At the angle between these surfaces, there is provided a groove 81 for receiving the edge of the lid. This groove extends completely through the body of the jaw and, as indicated in FIGURE 7, its outer wall 82 angles inwardly toward the outer or forward end of the jaw. Thus, the outer walls of the grooves of the two jaws converge so that as the lid is gradually moved therebetween, the edge of the lid L is gradually gripped with increasing pressure so as to produce a bowing thereof and this bowing is controlled so that the center of the lid will bow downwardly (FIGURE 5) to produce a convex lower surface and a concave upper surface, to facilitate engagement by the leading end of the stripper 40.

To cause bowing of the lid in the direction indicated, the outer wall of each groove also angles upwardly and outwardly, as indicated best in FIGURE 7a. The result is that as the edge of the lid L is gradually gripped at diametrically opposed points between the surfaces 82, its edge tends to move upwardly and outwardly along such surfaces thereby bowing the lid as indicated. At the outer extremity of each jaw where the lid will be finally gripped, the jaw is provided with a vertical cap-engaging surface 83 which is curved in a longitudinal direction. Each surface 83 is of a relatively short radius of curvature as compared to the surface 70 and, as indicated in FIGURE 7, is offset laterally outwardly beyond the outer wall 82 of the groove 81. At this point the slot or groove 81 merges with the surface 83 so that when the lid moves into its final position relative to the opening 60, its edges snap into recessed curved surfaces 83 and its edges are bowed upwardly into engagement with the flat surfaces 80 of the jaws and there will be no possibility of the lid moving downwardly out of the jaws, as shown best in FIGURE 5. Because of the arrangement of the curved surfaces 83 further outward movement of the lid will be resisted after it is positioned therein, as will be apparent from FIGURE 7. Downward movement of the plunger (not shown) will cause it to engage the concave upper surface of the lid causing it to move downwardly with its edge sliding downwardly along the two diametrically opposed surfaces 83. The surfaces 83 will be of a curvature of a smaller radius than that of the smallest lid to be handled by the jaws 61 and 62. The radius of curvature of the opening 60 will be greater than that of the largest lid to be handled. At its lower extremity (FIGURE 5) each surface 83 is flared outwardly at 84 to permit flattening of the cap as it leaves the jaws.

The jaws are adjusted relatively precisely in accordance with the diameter of the lid to be dispensed. It will be noted that at the inner extremity of the surface 80, each jaw is notched as indicated at 85a (FIGURES 5 and 6) to prevent interference with the stripper 40 when the jaws are adjusted inwardly close together. Also, each jaw is chamfered downwardly at the entrance end of the groove 81 (FIGURES 7, 10 and 11) to facilitate entrance of the lid into the grooves.

It will be apparent from the above that this invention provides a lid-dispensing unit which will dispense individual lids successively from the lower end of a stack even if the lids are very thin. The dispensing of one lid at a time in an effective manner and the holding of it in container insertion position is insured by having the jaws so formed that the lid is bowed as the stripper moves the lid outwardly between the jaws and it is gradually gripped. When it reaches its final position between the jaws, the lid will be securely held in place without danger of it snapping out of place accidentally. The magazine cooperates with the jaws in that it provides means for selectively locating the tab lids relative to the jaws to obtain flexing in the proper direction depending on the nature of the particular batch of lids.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A lid-dispenser comprising a magazine in which a stack of the lids are disposed, a stripper for feeding the lowermost lid horizontally from the magazine to a selected location, a pair of jaws at the selected location between which the lid is fed, said jaws having horizontal, lid-edge receiving slots into which the lid is fed, the outer walls of said slots converging relatively so that as the lid is moved therebetween, it is gripped at diametrically opposed points and is bowed into concavo-convex form, said outer walls of said slots angling upwardly outwardly so that the edge of the lid will move upwardly thereon to cause the lower surface of the lid to be convex and the upper surface thereof to be concave.

2. A lid-dispenser according to claim 1 in which the jaws also have vertically disposed horizontally curved surfaces at the outer ends of the slots with which the slots merge and against which the edge moves as the lid is pushed downwardly.

3. A dispenser according to claim 1 for dispensing lids of disc-like form having radially projecting tabs, said magazine having upright guides including tubes of U-form opening inwardly which are adapted to selectively receive the tabs to orient the lids relative to the lid-gripping jaws.

4. A dispenser according to claim 1 in which the jaws are mounted for movement together and relatively, and means for selectively adjusting the jaws relatively or together.

5. A lid-dispenser according to claim 1 including outward curved recesses at the outer ends of said slots into which the edge of the lid moves and is finally positioned as it leaves said slots.

6. A lid-dispenser comprising a magazine in which a stack of the lids are disposed, said magazine including a plate having an opening through which the lids will drop, a base plate on which said magazine plate is supported and underlying said opening, said base plate having an upwardly-opening stripper bar receiving channel extending under the opening, a stripper bar mounted in said channel for reciprocation, a lid guide channel extending from said opening outwardly in centered relationship to said stripper bar channel, and a pair of jaws outwardly of said lid guide channel for receiving and gripping a lid removed through said lid channel by said stripper bar, said lower surface of the magazine plate being recessed upwardly to receive said stripper bar, said magazine plate having a chamfered edge at said opening at each side of said recess outwardly thereof but having a sharp edge immediately adjacent said recess.

7. A lid-dispenser according to claim 6 in which said magazine plate carries a hold-down member adjustable to be positioned directly over said stripper bar.

8. A lid-dispenser according to claim 7 in which said jaws have slots for receiving the lid fed by the stripper therebetween and for gripping it at diametrically opposed points, said slots being chamfered downwardly at their inlet ends to facilitate entrance of the lid.

9. A lid-dispenser according to claim 8 in which the outer walls of said slots converge relatively so that as the lid is moved therebetween, it is gripped at diametrically opposed points and is bowed into concavo-convex form, said outer walls of said slots angling upwardly outwardly so that the edge of the lid will move upwardly thereon to cause the lower surface of the lid to be convex and the upper surface thereof to be concave.

10. A lid-dispenser according to claim 9 having curved outward recesses at the outer end of said slots in which said lid edge will be finally positioned.

References Cited in the file of this patent

UNITED STATES PATENTS

| 1,065,395 | Rese | June 24, 1913 |
| 1,360,463 | Strandt | Nov. 30, 1920 |
| 1,964,078 | Podel | June 26, 1934 |
| 2,264,638 | Blann | Dec. 2, 1941 |
| 2,398,659 | Mead | Apr. 16, 1946 |